(12) United States Patent
Fontana et al.

(10) Patent No.: US 7,894,601 B2
(45) Date of Patent: Feb. 22, 2011

(54) METHOD FOR KEY DIVERSIFICATION ON AN IC CARD

(75) Inventors: Giovanni Fontana, Naples (IT); Saverio Donatiello, Mercogliano (IT)

(73) Assignee: Incard S.A., Geneva (CH)

( * ) Notice: Subject to any disclaimer, the term of this patent is extended or adjusted under 35 U.S.C. 154(b) by 845 days.

(21) Appl. No.: 11/771,326

(22) Filed: Jun. 29, 2007

(65) Prior Publication Data

US 2008/0008315 A1    Jan. 10, 2008

(30) Foreign Application Priority Data

Jun. 29, 2006   (EP) .................................. 06013463

(51) Int. Cl.
*H04L 9/00* (2006.01)

(52) U.S. Cl. .................. 380/44; 380/277; 713/168; 713/169

(58) Field of Classification Search .................. 713/169, 713/168; 380/277, 44
See application file for complete search history.

(56) References Cited

U.S. PATENT DOCUMENTS

| 6,263,420 | B1* | 7/2001 | Tan et al. ...................... 712/42 |
| 6,490,353 | B1* | 12/2002 | Tan .............................. 380/37 |
| 6,687,375 | B1* | 2/2004 | Matyas et al. ................. 380/45 |
| 6,704,871 | B1* | 3/2004 | Kaplan et al. ................ 713/192 |
| 2002/0062451 | A1* | 5/2002 | Scheidt et al. .............. 713/201 |
| 2003/0228886 | A1* | 12/2003 | Ishii et al. .................... 455/558 |
| 2005/0036612 | A1* | 2/2005 | Shiina ......................... 380/44 |
| 2006/0177065 | A1* | 8/2006 | Halbert ....................... 380/277 |
| 2006/0195695 | A1* | 8/2006 | Keys ........................... 713/169 |

FOREIGN PATENT DOCUMENTS

| FR | 2681165 | 3/1993 |
| WO | 96/05675 | 2/1996 |

* cited by examiner

*Primary Examiner*—Nabil M El Hady
(74) *Attorney, Agent, or Firm*—Lisa K. Jorgenson; Allen, Dyer, Doppelt, Milbrath & Gilchrist, P.A.

(57) ABSTRACT

Key diversification is performed during a mutual authentication between a SAM integrated circuit (IC) card storing a master key, and a user IC card storing an identification number. The user IC card is connected to the SAM IC card through a communications interface. The key diversification includes deriving sub keys from the master key, and computing ciphered strings through corresponding cryptographic computations on a string obtained by an elaboration on the identification number with the sub keys. A diversification key is generated by linking together a combination of bytes of the ciphered strings.

17 Claims, 3 Drawing Sheets

METHOD FOR KEY DIVERSIFICATION ON AN IC CARD

FIELD OF THE INVENTION

The present invention relates to a method for generating key diversification during a mutual authentication between a master integrated circuit (IC) card storing a master keys and a user IC card associated with an identification number, with the user IC card being connected to the master IC card through a communications interface.

More particularly, the present invention relates to the mutual authentication between the user IC card and the master IC card, with communications between such IC cards being authorized if they both authenticate each other.

BACKGROUND OF THE INVENTION

In most IC card applications a user IC card is connected to a master IC card through a terminal. The user and the master IC card, hereinafter referred to as a user card and a master card, authenticate each other before starting a communication. More particularly, it is a standard practice to use a central unit to read the master card. The central unit is connected to a plurality of terminals intended to communicate with the user cards.

The terminals are interconnected through a network to the central unit so that the master card may communicate with the user cards, but two different user cards cannot communicate together. More particularly, a data processing system makes it possible to carry out secure transactions between the user cards and the master cards and, at the same time, it does not permit a mutual secure transaction between two user cards.

More particularly, the data processing system requires that, during the establishment of a common session key between two cards, each of the cards has a personal secret key identical to the secret key of the other card for establishing a common session key.

In general, a secret key is obtained by the diversification of a master key that is a secret key stored in the master card. Each secret key obtained in this way is consequently the result of a calculation involving the master card and a parameter specific to the user card with which the master card wishes to communicate.

The master and user cards are able to authenticate one another by verifying signatures through an identity-based key algorithm. Such a key algorithm may also permit the establishment of a session key between the two cards for implementing arithmetic operations like multiplications, powers, and divisions on numbers of several hundred bits. This calculation complexity makes it necessary for producing such cards to have top of the line components, which are at present very expensive.

The use of a diversification algorithm will now be schematically described during a mutual authentication between the user and the master card. Such a mutual authentication is intended to mutually ensure that the user card is authorized to read information stored in the master card, and/or vice versa.

The master card comprises at least a first memory unit storing a first plurality of data, and the user card comprises at least a second memory unit storing a second plurality of data. Generally, at least a portion of the first and the second plurality of data are secret and require protection. For example, protection may be required because they comprise sensitive data or information used in secure transactions in a banking application.

As schematically shown in FIG. 1, a POS terminal 3 connects a master SAM card 1 and a user card 2. The connection is schematically represented through a first slot 3a and a second slot 3b provided from the POS terminal 3 itself. The master SAM card 1 comprises at least a first memory unit 1a storing a first plurality of data, and the user card 2 comprises at least a second memory unit 2a including a second plurality of data.

The memory unit 1a inside the master SAM card 1 holds a Master Key 1M and a Function 1F. The Function 1F is used to derive an additional Key relating to the user card 2 inserted in the second slot 3b of the POS terminal 3. More particularly, such an additional key, hereinafter indicated as a Child Unique Key 1K, is used to implement the mutual authentication between the master SAM card 1 and the user card 2.

The authentication provides that a card identification number, for example a card serial number 2sn generally stored in the second memory unit 2a of a user card 2, is transmitted to the master SAM card 1. The Function 1F processes through the Master key 1M and the card serial number 2sn a Child Unique Key 1K to be used to authenticate a corresponding user card 2.

The function 1F processing the Master Key 1M and the user card serial number 2sn to obtain a Child Unique Key 1K is also known as a key diversification algorithm. Each Child Unique Key 1K corresponding to a user card 2 is diversified by each other Child Unique Key 1K corresponding to other user cards 2.

Once the master SAM card 1 has generated the Child Unique Key 1K, it also generates a Random number 1rand, stores it in the first memory unit 1a and sends it to the user card 2. The user card 2 reads the Random number 1rand through the POS terminal 3, encrypts it and sends it back to the master SAM card 1 as an encrypted random number 2enc-rand.

The master SAM card 1 may decrypt the encrypted Random number 2enc-rand through the Child Unique Key 1K corresponding to the user card 2 inserted inside the second slot 3b, and previously stored in the first memory unit 1a. The result of such a decryption is compared to the Random number 1rand stored in the first memory unit 1a of the master SAM card 1. If the result of the decryption is equal to the Random number 1rand previously stored, the master SAM card 1 authenticates the user card 2. Otherwise, the master SAM card 1 rejects the user card 2.

More particularly, if the master SAM card 1 authenticates the user card 2, a reverse authentication method called from the user card 2 and intended to authenticate the master SAM card 1 is performed. The reverse authentication substantially comprises all the computations described above to authenticate the user card 2.

The processing of a diversification key through a key diversification algorithm is a time consuming operation that has an impact not only when a secret key is loaded in an IC card, but also when a mutual authentication algorithm needs to be processed to authenticate a master card by a user card, and vice versa. The processing of a diversification key through the diversification algorithm is in fact a step of the mutual authentication algorithm.

Especially in critical applications, the security and the execution speed of the operations between the user card and the terminal may be damaged by the complexity of the key diversification algorithm. Actually, a method is not known for implementing a key diversification algorithm on an IC card with security and in an acceptable time, especially when such an IC card is not provided with special hardware able to support time consuming and computational expensive processing.

Moreover, a method implementing the key diversification comprising a plurality of operations also influencing the mutual authentication between a master and a user card limits the number of communications sessions between the master card and user cards.

SUMMARY OF THE INVENTION

In view of the foregoing background, an object is to provide a method implementing key diversification for reducing the time required by a mutual authentication between the master IC card and the user IC card to ensure at least the same level of security provided by the prior art methods. This may be executed at the same time through non-time consuming and non-computational intensive operations.

This and other objects, advantages and features are provided by a method for generating a key diversification through a master key stored in a master IC card and an identification number associated with a user IC card, wherein the method comprises nonexpensive computational operations, like CRC, DES and XOR operations, that are supported by common hardware included in an IC card.

More particularly, such operations may comprise the derivation of at least a couple of sub keys from the master key, the computation of at least a couple of ciphered strings through the derived sub keys, and the generation of the diversification key based on an elaboration of the ciphered strings.

BRIEF DESCRIPTION OF THE DRAWINGS

Further characteristics and advantages of the method for generating a diversification key according to the present invention will be apparent from the following description of an embodiment thereof, made with reference to the annexed drawings, given for illustrative and non-limiting purposes.

DETAILED DESCRIPTION OF THE PREFERRED EMBODIMENTS

Figure 1:
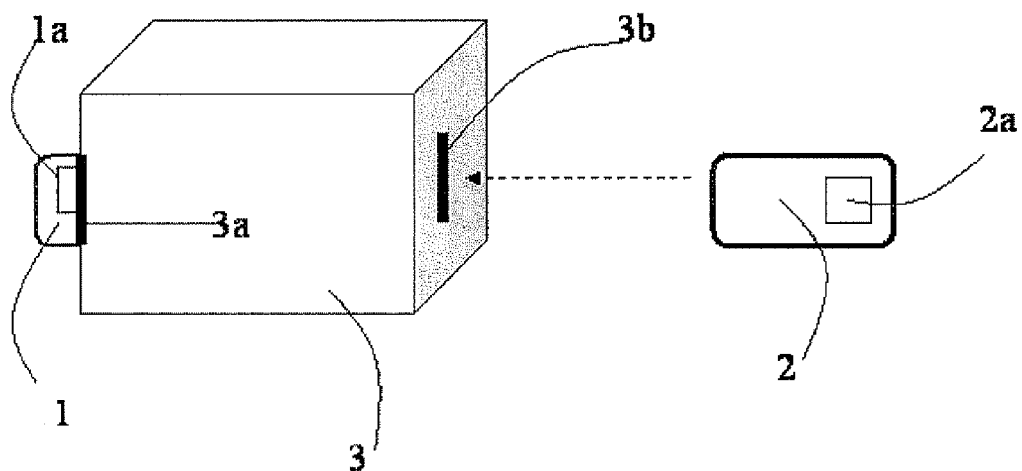
FIG. 1 schematically represents a first IC card inserted in a first slot of a terminal for communicating with a second IC card according to the prior art.
Figure 2:
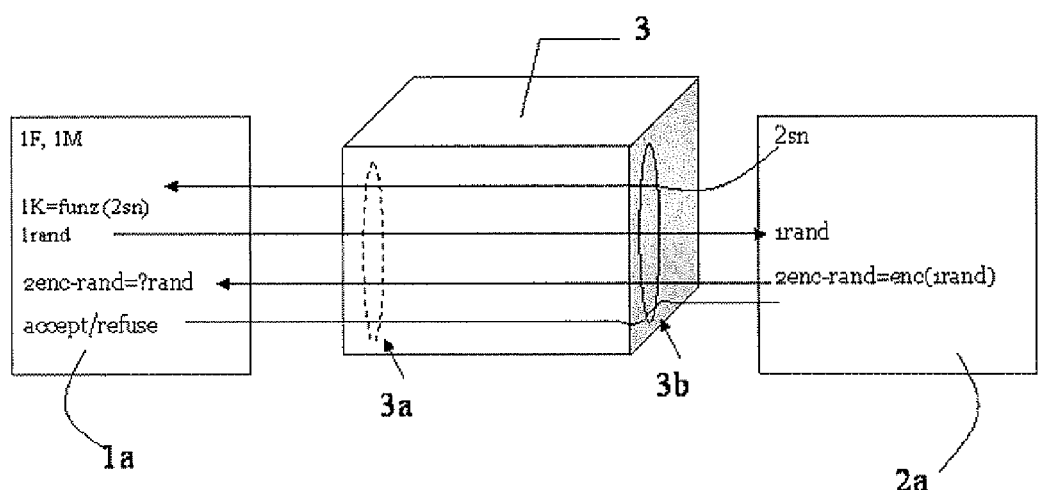
FIG. 2 schematically represents the flow of data between a first IC card inserted in a first slot of a terminal, and a second IC card according to the prior art.
Figure 3:
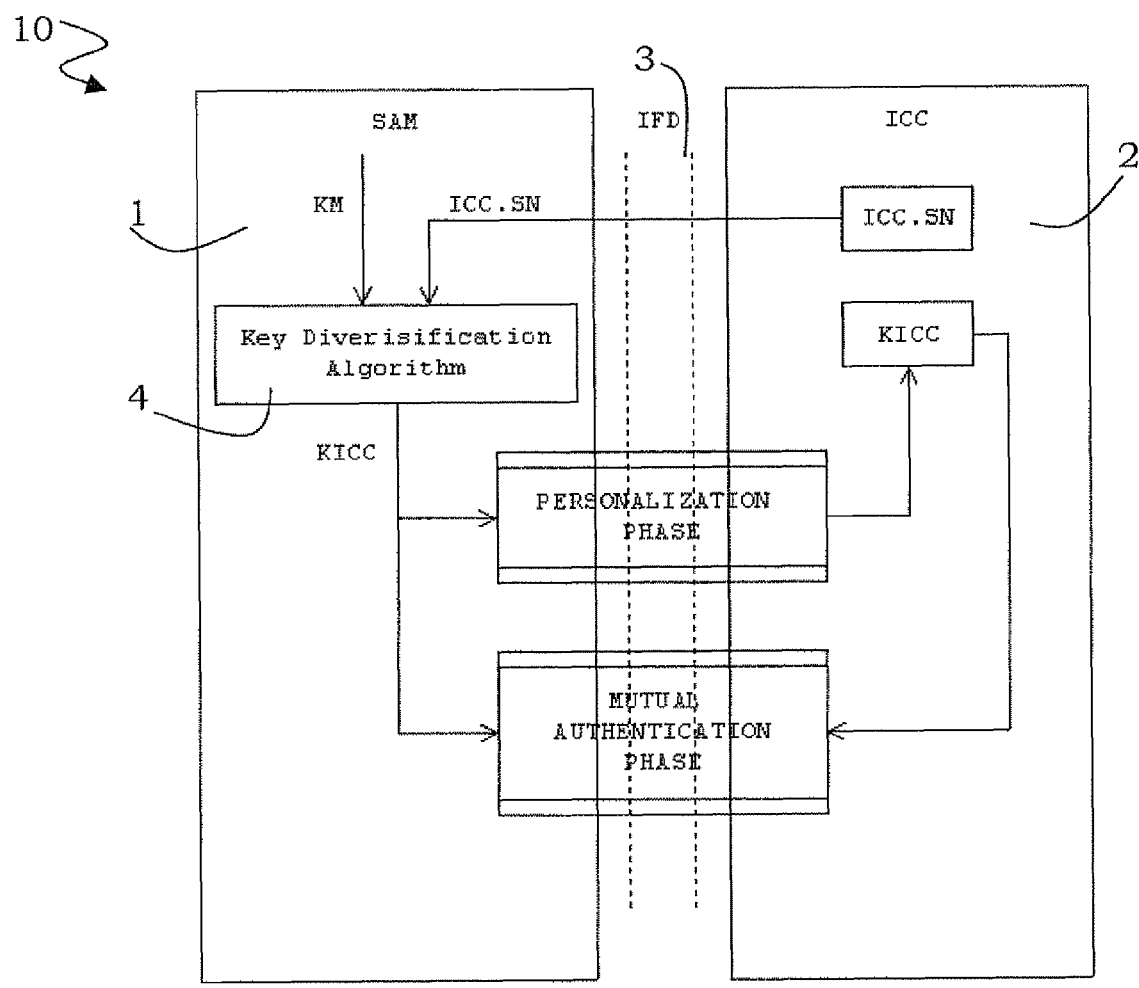
FIG. 3 is a block diagram of a mutual authentication between a SAM and a user IC card including the method for key diversification according to the present invention.

Referring now to FIG. 3, a block diagram 10 schematically represents a mutual authentication between a couple of IC cards. More particularly, an interface ITF 3 drives a connection between a SAM master card 1 and a user card 2. The interface ITF 3 belongs to a terminal POS for a banking application, for example.

The user card 2 and the SAM master card 1, before starting a communication, authenticate each other through the mutual authentication. More particularly, such a mutual authentication comprises a method for key diversification that is schematically represented with a block logic unit 4 of the block diagram 10.

The SAM card 1 stores a master key $K_M$, for example a 16-byte key. The master key $K_M$ is used in combination with a unique identification number of the user card 2 to obtain a diversification key. The method for key diversification provides a data input comprising the master key $K_M$ and an identification number for the user card 2, for example a serial number ICC.SN stored in the user card 2. Such a serial number is unique for each user card 2, and may be an 8-byte long string, for example. The method provides a plurality of computations on such input data, comprising the following.

Process a CRC on the ICC.SN. For example, the ISO 3309 CRCB may be used to obtain C=CRC(ICC.SN), with C being a string 2-byte long. This is a non-limiting example because other types of CRC may be used for this step.

Build a plain text string chaining the ICC.SN, with a sequence and with one or more bytes CRC. For example, a sequence like 80 00 00 00 00 00 may be used, followed by 2-byte CRC to obtain a text string T=ICS.SN | |80 00 00 00 00 00 $C_2$ $C_1$. More particularly, $C_2$ represents the most significant byte of C, and $C_1$ represents the less significant byte of C.

Compute two DES computations on the text string T built at the previous step using as a key for DES respectively $K_{Ma}$, and $K_{Mb}$ for obtaining two 16-byte long ciphered text strings A and B. For example, for the DES computation an initial vector is set to 0 and the mode is CBC.

Perform an operation on the two 16-byte long ciphered text strings A and B, based on a fixed byte combination, so as to obtain two 8-byte strings as a result. For example, an XORing operation may be used at this step.

Figure 4:
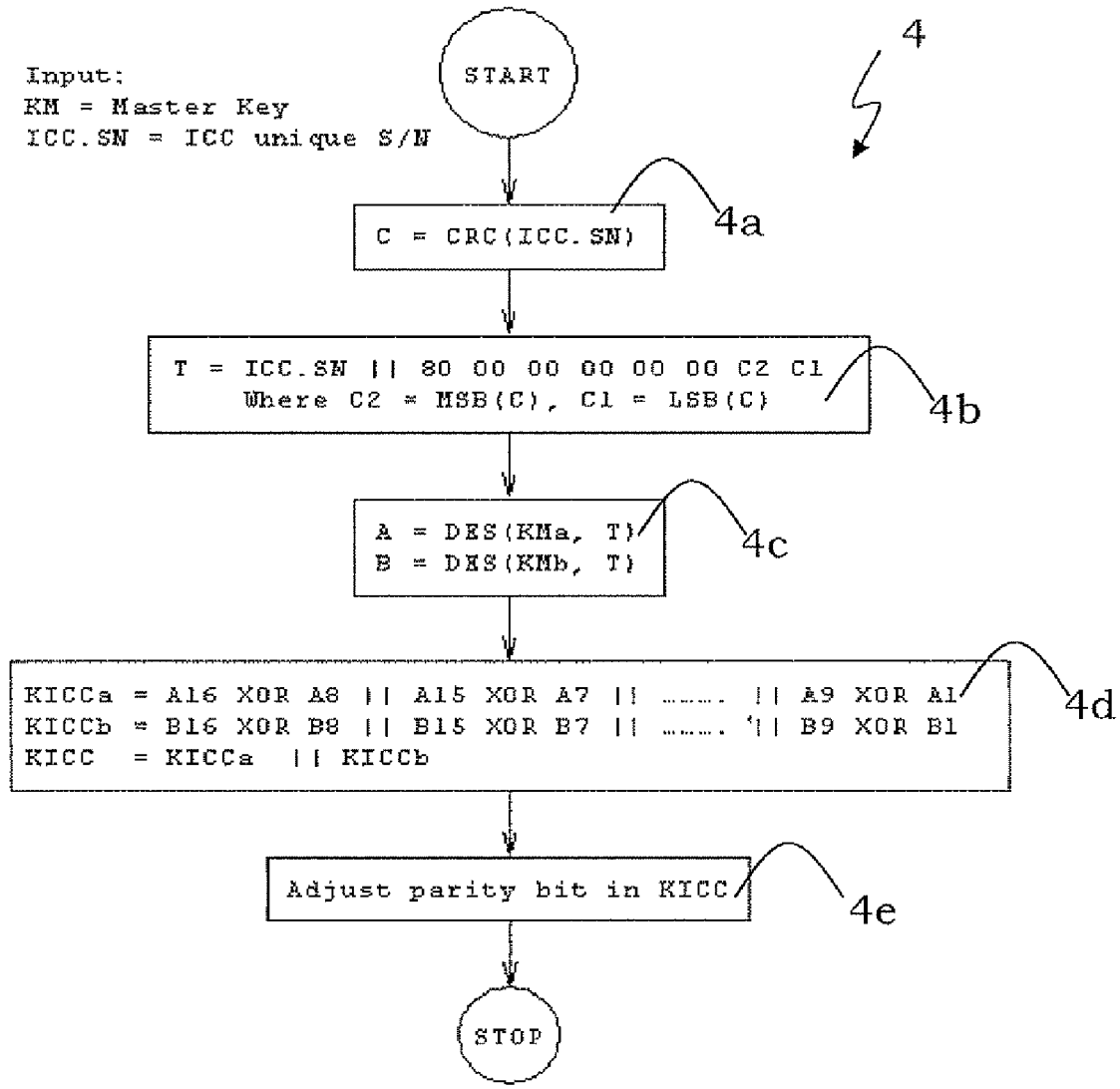
FIG. 4 schematically represents in greater detail the block of FIG. 3 representing the method for key diversification according to the present invention.

Concatenate or link together the two 8-bytes strings and building up a diversified key $K_{ICC}$. Adjusting a parity bit for the diversified key $K_{ICC}$ With reference to FIG. 4, the steps belonging to the method for key diversification are represented in more specific details. The Key Diversification method intended to load a diversified key in a user card 2, for example during a personalization phase of the user card 2, is globally indicated with numeral reference 4.

More particularly, the Key Diversification method is also used during a mutual authentication between the SAM card 1 and the user card 2, so as to verify the authenticity of the respective counterpart before proceeding with critical operations. The method for diversifying the Key provides as data input the user IC card serial number associated to the user card 2, and the master key stored in the SAM IC card.

According to the illustrated method, a first elaboration of such a user card serial number is provided, for example a CRC computation of ICC.SN is processed C=CRC(ICC.SN), resulting in a 2-byte long string. Such a first elaboration is schematically represented by the block logic unit 4a in FIG. 4.

The CRC algorithm may be compliant with ISO 3309 and compatible with the CRCB calculation. More particularly, the method for key diversification processes ICC.SN, which is 8-bytes long, and the SAM master key $K_M$ to obtain a concatenation of two text strings 8-bytes long.

The SAM master key $K_M$, loaded in the SAM card, is a 16-byte long key of the type $K_M=K_{M16}, K_{M15}, \ldots K_{M1}$ and is a 16-byte long text string.

$K_M$ is used to derive:

$K_{Ma}=K_{M16}, K_{M15}, \ldots K_{M9}$, and $K_{Mb}=K_{M8}, K_{M7}, \ldots K_{M1}$ that are two 8-byte long text strings.

As shown in the block logic unit 4b, the method for key diversification provides a concatenation between the user card serial number ICC.SN and the number C processed during a previous step. Such a concatenation is directed to obtain a text string T.

For example, T=ICC.SN | | 80 00 00 00 00 00 $C_2 C_1$, where $C_2$ is the most significant byte of C, and $C_1$ is the less significant byte.

More particularly, if A is a string of n-bytes of the type $A=A_n, A_{n-1}, \ldots A_1$ where $A_i$ is the i-th byte in A, then $A_n$ is defined as the most significant byte (MSB) of A while $A_1$ is the least significant byte (LSB) of A. On the number T computed at step 4b, a DES computation is processed as schematically shown at step 4c.

More particularly, the key $K_{Ma}$ is used to obtain A=DES($K_{Ma}$, T), that is, a 16-byte long ciphered text string. Similarly, another computation is calculated on T, B=DES($K_{Mb}$, T), so as to obtain another 16-byte long ciphered text string.

According to the method, a computation on A is executed at step 4d to obtain a text string 8-bytes long of the type $K_{ICCa}=A_1$ XOR $A_9 || A_2$ XOR $A_{10} || \ldots || A_8$ XOR $A_{16}$. More particularly, XOR is a Boolean operation also known as exclusive OR. Similarly, a computation on B is intended to obtain a corresponding ciphered text string 8-bytes long $K_{ICCb}=B_1$ XOR $B_9 || B_2$ XOR $B_{10} || \ldots || B_8$ XOR $B_{16}$.

According to the method, the diversified key $K_{ICC}$ is obtained by a concatenation of $K_{ICCa}$ and $K_{ICCb}$, $K_{ICCa}|K_{ICCb}$. According to the previous assumption, the diversified key $K_{ICC}$ is a 16-byte long text string. The parity bits of $K_{ICC}$ are adjusted, as schematically represented in the block logic unit 4e. For example, in each byte of $K_{ICC}$ the parity bit is the least significant bit. For each byte in $K_{ICC}$ the parity may be set to odd.

The method is advantageously based on very fast computational steps comprising CRC, DES and XOR computations. Most microprocessors currently in use for IC cards have integrated in hardware peripherals for CRC and DES computations.

The TABLE 1, for each step of computation according to the method, represents the expected computation time. The valuation is done considering an 8-bit CPU running at 10 MHz with CRC and DES hardware accelerator.

The computation time for the method for key diversification is expected to be less than 1 msec.

TABLE 1

8-bit CPU, clock 10 MHz, with CRC & DES HW accelerator

| Step Nr. | Expected Time in μsec |
| --- | --- |
| 4a | 30 |
| 4b | 5 |
| 4c | 150 |
| 4c | 150 |
| 4d | 10 |
| 4d | 10 |
| 4d | 5 |
| 4e | 150 |
| Tot. | 510 μsec |

The method is based on the basic hypothesis that the master key $K_M$ is secret and unknown externally to the SAM. This ensures the security of the diversification method.

The method processes key diversification without a lack of security in the IC card with time critical applications so that Key diversification is also provided when the IC card is not provided with special hardware to speed up computational intensive operations.

The method for key diversification is used to load in the IC card a diversified secret key during the IC card personalization phase, and also during a mutual authentication between an IC card and an external terminal equipped with a master SAM IC card. This is for reducing the computational time for such a mutual authentication.

The mutual authentication may comprise a method to diversify the key of a user card during the communication with a master SAM card. The method also provides security and efficiency in terms of execution time and non-ambiguity. In fact, different IC cards have different serial numbers, assuring the requirement of non-ambiguity. The ICC.SN is read out and transferred to the master SAM card by an Interface device.

Few computational steps are advantageously performed to obtain the diversified key stored in the IC card. The computation is not based on computational intensive operations, such as CRC, DES and XOR, which assures the efficiency requirement.

That which is claimed:

1. A method for generating a diversification key during an authentication between a master IC card having a master key associated therewith and a user IC card having an identification number associated therewith, the method comprising:
    deriving a plurality of sub-keys from the master key;
    computing a plurality of ciphered strings through corresponding cryptographic computations on a string with the sub-keys, the string obtained by performing an elaboration of the identification number;
    the elaboration comprising performing
        a CRC operation on the identification number, and
        a concatenation of the identification number with a fixed text string and at least one of a most significant byte and a least significant byte of the CRC operation; and
    building the diversification key by concatenating a combination of bytes of the plurality of ciphered strings.

2. A method according to claim 1, further comprising coupling the user IC card and the master IC card through a communication interface.

3. A method according to claim 1, wherein the combination of bytes is obtained by performing a XOR operation on the plurality of ciphered strings.

4. A method according to claim 1, further comprising adjusting at least one parity bit for the diversification key.

5. A method according to claim 1, wherein the cryptographic computations comprise at least one DES computation.

6. A method for generating a diversification key during a mutual authentication between a master IC card having a master key associated therewith, and a user IC card having an identification number associated therewith, the user IC card being connected to the master IC card through a communication interface, the method comprising:
    deriving a plurality of sub-keys from the master key;
    computing a plurality of ciphered strings through corresponding cryptographic computations on a string with the sub-keys, the string obtained by performing an elaboration on the identification number including a CRC operation on the identification number;
    the elaboration also including a concatenation of the identification number with a fixed text string and at least one of a most significant byte and a least significant byte of the CRC operation; and
    building the diversification key by concatenating a combination of bytes of the plurality of ciphered strings.

7. A method according to claim 6, wherein the combination of bytes is obtained by performing a XOR operation on the plurality of ciphered strings.

8. A method according to claim 6, further comprising adjusting at least one parity bit for the diversification key.

9. A method according to claim 6, wherein the cryptographic computations comprise one or more DES computations.

10. An IC card having an identification number associated therewith to communicate with a master IC card having a master key associated therewith, the IC card comprising:
 an IC card substrate; and
 a processor carried by said IC card substrate and being configured to derive a plurality of sub-keys from the master key and to compute a plurality of ciphered strings through corresponding cryptographic computations on a string with the sub-keys, the string obtained by performing an elaboration of the identification number;
 said processor performing the elaboration by
  performing a CRC operation on the identification number, and
  performing a concatenation of the identification number with a fixed text string and at least one of a most significant byte and a least significant byte of the CRC operation;
 said processor being further configured to build a diversification key by concatenating a combination of bytes of the plurality of ciphered strings.

11. An IC card according to claim 10, wherein said processor is configured to obtain the combination of bytes by performing a XOR operation on the plurality of ciphered strings.

12. An IC card according to claim 10, wherein said processor is further configured to adjust at least one parity bit for the diversification key.

13. An IC card according to claim 10, wherein said processor performs the cryptographic computations by performing at least one DES computation.

14. A communication system comprising:
 a master IC card having a master key associated therewith;
 a user IC card having an identification number associated therewith and comprising:
  an IC card substrate, and
  a processor carried by said IC card substrate and being configured to derive a plurality of sub-keys from the master key and to compute a plurality of ciphered strings through corresponding cryptographic computations on a string with the sub-keys, the string obtained by performing an elaboration of the identification number,
 said processor performing the elaboration by
  performing a CRC operation on the identification number, and
  performing a concatenation of the identification number with a fixed text string and at least one of a most significant byte and a least significant byte of the CRC operation;
 said processor being further configured to build a diversification key by concatenating a combination of bytes of the plurality of ciphered strings; and
 a communication interface to couple said master IC card to said user IC card.

15. A communication system according to claim 14, wherein said processor is configured to obtain the combination of bytes by performing a XOR operation on the plurality of ciphered strings.

16. A communication system according to claim 14, wherein said processor is further configured to adjust at least one parity bit for the diversification key.

17. A communication system according to claim 14, wherein said processor performs the cryptographic computations by performing at least one DES computation.

* * * * *